(12) United States Patent
Ebner et al.

(10) Patent No.: US 7,967,723 B2
(45) Date of Patent: Jun. 28, 2011

(54) PLACING AN AUTOMATIC SYNCHRONIZED TRANSMISSION INTO A STARTING SPEED

(75) Inventors: Otto Ebner, Friedrichshafen (DE); Thomas Jäger, Meckenbeuren (DE); Florian Schneider, Lindenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 413 days.

(21) Appl. No.: 11/663,394

(22) PCT Filed: Jul. 15, 2005

(86) PCT No.: PCT/EP2005/007697
§ 371 (c)(1),
(2), (4) Date: May 16, 2007

(87) PCT Pub. No.: WO2006/032318
PCT Pub. Date: Mar. 30, 2006

(65) Prior Publication Data
US 2008/0045380 A1    Feb. 21, 2008

(30) Foreign Application Priority Data
Sep. 22, 2004  (DE) .......................... 10 2004 045 829

(51) Int. Cl.
*B60W 10/00* (2006.01)
(52) U.S. Cl. ......................... 477/93; 192/219
(58) Field of Classification Search .................. None
See application file for complete search history.

(56) References Cited

U.S. PATENT DOCUMENTS

| | | | | |
|---|---|---|---|---|
| 5,119,694 A | * | 6/1992 | Sato et al. | 477/93 |
| 5,460,580 A | | 10/1995 | Streib | |
| 5,893,816 A | * | 4/1999 | Ashida | 477/111 |
| 5,906,559 A | * | 5/1999 | Murasugi et al. | 477/93 |
| 6,039,673 A | * | 3/2000 | Mikami et al. | 477/93 |
| 6,434,466 B1 | * | 8/2002 | Robichaux et al. | 701/54 |
| 7,419,455 B2 | * | 9/2008 | Hardtle et al. | 477/93 |

FOREIGN PATENT DOCUMENTS

| | | |
|---|---|---|
| DE | 43 15 843 A1 | 11/1994 |
| DE | 102 42 823 A1 | 3/2004 |
| EP | 0 276 609 A1 | 8/1988 |
| WO | WO-03/097401 A1 | 11/2003 |

* cited by examiner

*Primary Examiner* — Justin Holmes
(74) *Attorney, Agent, or Firm* — Davis & Bujold, P.L.L.C.

(57) ABSTRACT

A method and a apparatus for operating an automatic synchronized transmission for motor vehicles. The transmission having a countershaft design, with a countershaft parallel to input and an output shafts, which communicate with each other and the countershaft by means of gear wheel pairs. The transmission further having at least one coupling and synchronization device for at least one idler gear, with the aid of which at least one idler gear can be rotationally fixed to a transmission shaft, such that when the motor vehicle is stationary and a starting gear is engaged, torque of the countershaft is not drive-effectively reduced. Thus, ensuring that when the starting gear is engaged, no undesired acceleration of the vehicle occurs.

12 Claims, 1 Drawing Sheet

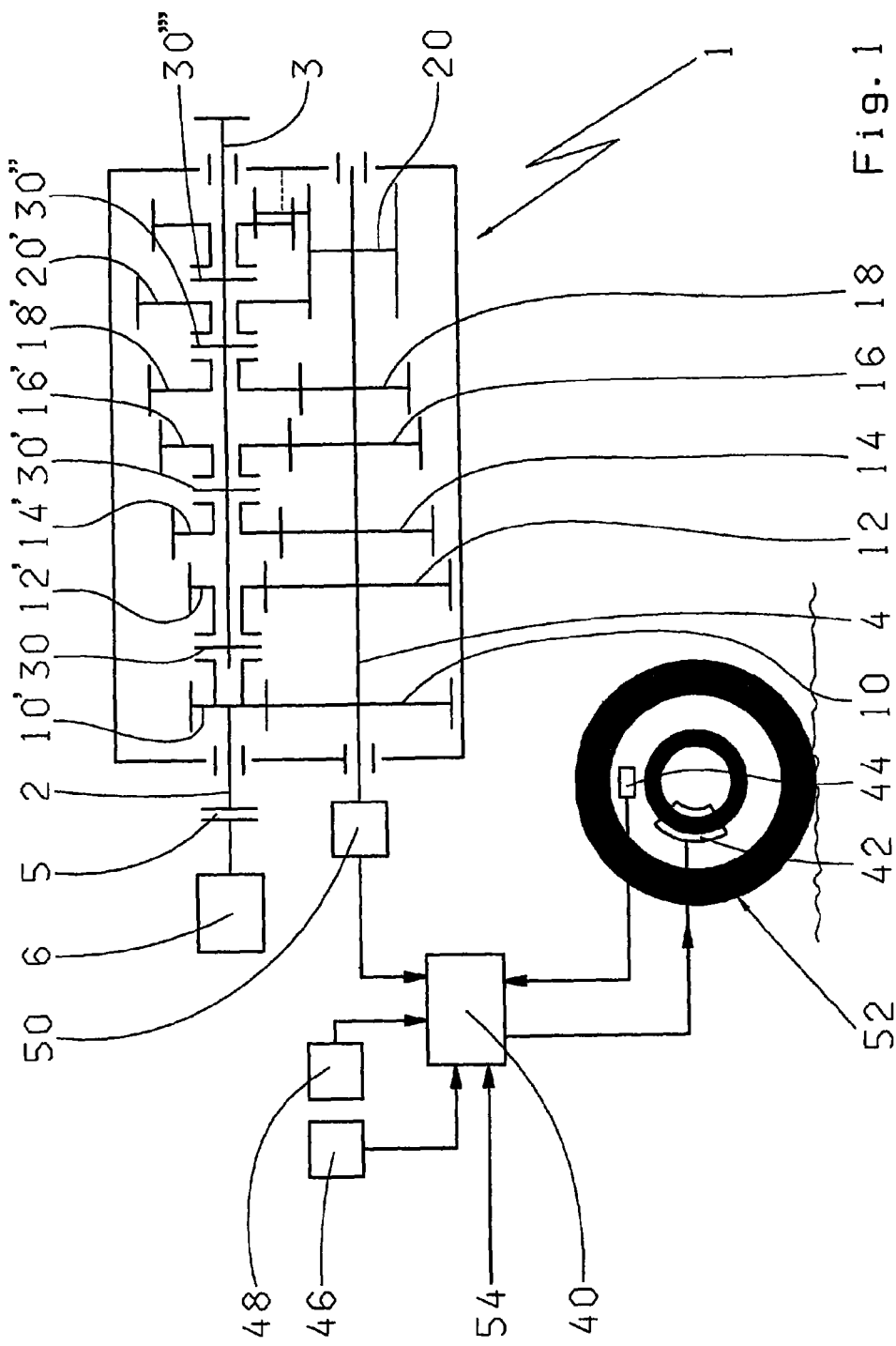

PLACING AN AUTOMATIC SYNCHRONIZED TRANSMISSION INTO A STARTING SPEED

This application is a national stage completion of PCT/EP2005/007697 filed Jul. 15, 2005 which claims priority from German patent application serial number 10 2004 045 829.4 filed Sep. 22, 2004.

FIELD OF THE INVENTION

The invention relates to a method and a device for operating an automatic synchronized transmission having a countershaft.

BACKGROUND OF THE INVENTION

Automatic synchronous transmissions, of the countershaft design, have been used in different types of motor vehicles for a considerable time. For example, DE 102 42 823 A1 discloses an automatic transmission of a countershaft design in which an input shaft and an output shaft are arranged coaxially and parallel to a countershaft. The drive torque of the input can be optionally transferable, via a fixed gear pair on the input shaft and the countershaft, as well as via gear-specific, idler-gear fixed gear pairs of the countershaft to the output shaft, or conducted, via a direct mechanical coupling, from the input shaft and the output shaft to the former.

This known transmission also has coupling devices by means of which the idler gears can be drivingly coupled to the output shaft in order carry out a concrete transmission shifting operation. A transmission brake is also present for the purpose of synchronizing the speeds by means of which the transmission gearwheels can be decelerated in order to perform up-shifting operations. In order to reduce manufacturing costs and optimize installation space, this transmission brake is designed as part of the coupling device as a whole, while the other coupling devices are independent of the braking and synchronization devices.

A disadvantage of this automatic synchronous transmission is that when engaging a starting gear, when the vehicle is at a standstill or at low speed, there can be unwanted acceleration. This is the case when the starting clutch was engaged before engaging the gear, and the vehicle is not braked against unwanted movement. The reason for this is that the speed of the countershaft must be decelerated to a speed near zero in order to engage a starting gear (the vehicle is at a standstill, so therefore the transmission output is also at a standstill). For this purpose, the kinetic energy of the countershaft is diminished via the transmission. However, this results in part of the kinetic energy of the countershaft leading to an acceleration of the transmission output. That leads to an unwanted acceleration of the vehicle.

Against this background, the task of the invention is to provide a method and a device for operating an automatically synchronized transmission, of a countershaft design, in which there is no unwanted acceleration of the vehicle when a starting gear is engaged and the vehicle is at a standstill.

SUMMARY OF THE INVENTION

The invention is based on the knowledge that unwanted vehicle acceleration, when engaging a starting gear and the vehicle is at a standstill, can be suppressed when a torque of the countershaft is not drive-effectively relieved when the vehicle is at a standstill and a starting gear is engaged.

A particularly advantageous approach is not to activate the actuators in the drive train of the motor vehicle, i.e., from the transmission to the vehicle drive wheels, in order to reduce drive-effectively a torque on the countershaft when the actual torque of the countershaft is greater than a predefined limit torque, starting at which, without actuator operation, an acceleration of the vehicle would be detected.

For example, the reduction of the torque of the countershaft occurs through the action of a braking control device on brake actuators on the drive wheels of the motor vehicle, in that the actuators are activated, in an engagement direction, at the point in time of engagement of the starting gear, and then activated in the disengagement direction when the actual torque of the countershaft has been reduced to below the value of the limit torque. In doing so, these kinds of actuators preferably act on devices that can reduce, by means of friction, this kind of drive torque.

An advantage of this method is that already existing devices in the motor vehicle, for example, a brake control device, a transmission brake and/or an parking brake can be employed, and that by a simple supplementary modification, unwanted vehicle acceleration, when engaging a starting gear, can be suppressed. This supplementary modification can be realized by means of hardware or software solutions.

In an additional advantageous version of the invention, the torque of the countershaft is brakingly reduced by means of a second synchronizing device. In doing this, this second synchronizing device provides synchronization by means of a gear that has a smaller transmission ratio than the starting gear. In that way, according to this method variant, the torque of the countershaft is reduced by means of a synchronization of a gear with a smaller transmission ratio ($n_{input}/n_{output}$) than the starting gear. Only when the countershaft is nearly at a standstill will the actual starting gear be engaged. This results in the torque acting on the output, due to the smaller transmission ratio, being smaller than it is when the starting gear is synchronized. In this case, the torque produced by the synchronization process is advantageously not sufficient to move the vehicle, which is at a standstill, as physical factors including static friction and the inertial mass of the motor vehicle counteract such movement. There is therefore no unwanted acceleration of the vehicle. Advantageously, the gear with the smaller transmission ratio is provided as the gear of the starting gear by means of an additional engageable gear section.

In a further advantageous embodiment, synchronization of the first synchronization device is initiated when the starting gear is engaged, by a force that is selected in such a way that a torque produced by the synchronization process, on the drive wheels of the vehicle, is so small that the vehicle remains at a standstill.

Preferably, during this process, the force is selected subject to the static friction of the drive wheels of the motor vehicle on the road surface and/or the inertial mass of the motor vehicle, and/or the longitudinal inclination of the motor vehicle.

In that way, when the starting gear in engaged, only a small force, but one appropriate for the operating state, is applied to the synchronization. The torque occurring at the transmission output is subject, among other things, to the force applied to the synchronization. The force is therefore selected in such a way that the torque produced by the synchronization process is not sufficient to move the vehicle, which is at a standstill, because physical factors, including the static friction and the inertial mass of the motor vehicle, counteract such movement. As a result, there is no unwanted acceleration of the vehicle.

The longitudinal incline of the vehicle can advantageously be determined by an inclination sensor which is contained, for example, in an airbag-release system for releasing an airbag. Alternatively, a separate inclination sensor can also be provided.

A device for implementing the cited method is characterized by a braking-control device, which is connected via sensor cables with a torque sensor on a countershaft of the synchronous transmission, as well as being connected with a sensor for determining the speed of the motor vehicle, which is connected via control cables with actuators for non drive-effective reduction of a torque on the countershaft, the braking-control device being configured in such a way that when the motor vehicle is at a standstill, and when the starting gear of the synchronous transmission is engaged by means of the braking-control device, a signal is transmitted to the actuators when the actual torque on the countershaft of the synchronous transmission is greater than a predetermined limit torque.

The signal for engaging the starting gear can advantageously be fed to the braking-control device by a transmission-control device. But it is also possible to have the braking-control device integrated into the transmission-control device.

The actuators are, for example, configured as brake actuators of a main brake and/or an parking brake of the motor vehicle.

But it is also feasible to have an actuator for activating a second synchronization device brakingly present. The second synchronization device is also advantageously arranged on a speed-change gear pair, which has a smaller transmission ratio than that of the starting gear.

When using this device, it is seen as advantageous that when engaging a starting gear, from a standstill or near-standstill of the motor vehicle, there is no unwanted acceleration of the vehicle that can originate from a residual torque of the countershaft.

BRIEF DESCRIPTION OF THE DRAWINGS

The invention can be further explained on the basis of an example of configuration. A drawing is added to the description for this purpose, in which FIG. 1 is a diagramatic view of, a transmission for an automatically synchronized transmission with a countershaft design.

DETAILED DESCRIPTION OF THE PREFERRED EMBODIMENT

In this synchronized transmission 1, an input shaft 2 and an output shaft 3, which is arranged coaxially to it, are arranged parallel to a countershaft 4. The input shaft 2 can be connected, via a clutch 5, with a main engine 6 of the motor vehicle. The countershaft gearwheels 10, 12, 14, 16, 18, and 20, which each mesh with a main-shaft gearwheel 10', 12', 14', 16', 18', and 20' whereby all main-shaft gearwheels are configured as idler gears, are secured to the countershaft 4 in a rotationally fixed and axially non-displaceable manner. Synchronization devices 30, 30', 30" and 30'", which have double-sided and single-sided sliding collars, are arranged on the transmission output shaft 2 in a rotationally fixed and axially displaceable manner between the idler gears. During a gear-shifting process, each sliding collar is axially displaced by means of a control device that is not shown.

In order to suppress unwanted acceleration of the vehicle when engaging a starting gear, when the vehicle is at a standstill or at a low speed, the potentially present residual torque of the countershaft 4 must be reduced. According to this variant of the invention, the reduction of this torque of the countershaft 4 is preferably indirectly reduced by the action of an electronic braking-control device 40.

In the version shown, the braking-control device 40 is connected, via control cables, with a conventional transmission brake 42. In addition, the braking-control device 40 can be connected in the same way, in terms of signaling technology, with an parking brake (not shown). In addition, the braking-control device 40 is connected with the measuring sensors 44, 46, 48, and 50 in order to collect vehicle-status data via sensor cables.

In this version, one of the measuring sensors is a drive-wheel rotational-speed sensor 44 for registering the rotational speed of a drive wheel 52. On the basis of this rotational speed or, as the case may be, a rate of rotation of the drive wheel 52, when the diameter of the drive wheel is known the driving speed of the vehicle can be calculated without difficulty. In addition, an inclination sensor 46 is present for registration of the current longitudinal inclination of the motor vehicle. In addition, there is a static-friction sensor 48 which, with the aid of physical vehicle-data, determines the current static-friction of the vehicle drive-wheels on the road surface. Finally, a torque sensor 50 is provided which determines the torque of the countershaft 4. In addition, when the starting gear is engaged, a signal 54 is fed to the braking-control device 40.

Using the raw data from the drive-wheel speed sensor 44, the braking-control device 40 determines whether or not the vehicle is at a standstill, or almost at a standstill. With the aid of the raw data from the torque sensor 50, the braking-control device 40 determines whether or not the current torque of the countershaft exceeds a previously established limit-torque value. The raw data of the inclination sensor 46 and the static-friction sensor 48 are used to determine a torque applied to the drive wheels 52, which would be sufficient to cause unwanted acceleration of the vehicle. When the braking-control device 40 determines, on the basis of the raw data from the sensors 44, 46, 48 and 50 and the signal 54, that a starting gear is being engaged, that the motor vehicle is standing still or almost standing still, that there is a torque on the countershaft 4 which is greater than the torque limit that would cause unwanted vehicle-acceleration of the motor vehicle, then the braking-control device 40 acts on the main brake 42 in such a way that its braking elements apply sufficiently great friction to the drive wheels 52 so that acceleration of the motor vehicle is prevented. Once the countershaft has been decelerated, with respect to its actual torque, below the limit torque or, as the case may be, the synchronizing process of the synchronized transmission 1 has been completed, the main brake 42 is once again released.

Therefore, when the starting gear is engaged, the braking-control device 40 works briefly on the main brake of the motor vehicle 42 such that any unwanted vehicle movement is suppressed. In this way, without the aid of additional components, a potentially present residual torque of the countershaft 4 can be quickly and simply reduced. After the torque of the countershaft 4 has been reduced or almost reduced, the action of the braking-control device 40 is once again terminated.

REFERENCE SIGNS

1 Synchronized transmission
2 Input shaft
3 Output shaft
4 Countershaft
5 Clutch
6 Engine
10, 12, 14, 16, 18, 20 Countershaft gearwheels, fixed gears
10', 12' 14', 16', 18', 20' Main shaft gearwheels, idler gears 30, 30', 30'', 30''' Synchronization devices
40 Braking-control device
42 Main brake
44 Drive wheel rotational speed sensor
46 Inclination sensor
48 Static friction sensor
50 Torque sensor
52 Drive wheel
54 Signal, engaging starting gear

The invention claimed is:

1. A method of operating an automatically synchronized transmission (1), of a countershaft design for a motor vehicle, comprising:
a countershaft (4) located parallel to an input shaft (2) and an output shaft (3), the input shaft (2) and the output shaft (3) are drive-effectively connected with one another and with the countershaft (4) via mating gear wheel pairs, and
the transmission (1) including at least one coupling and synchronization device (30, 30', 30'', 30''') for at least one idler gear (10', 12', 14', 16', 18', 20') such that the at least one idler gear can be connected with the output shaft (3) in a rotationally fixed manner,
the method comprising the step of:
when the motor vehicle is at a standstill and a starting gear is engaged, reducing an actual torque of the countershaft (4), via a decelerating device, to a level that prevents unwanted vehicle movement upon engaging the starting gear; and
determining that the actual torque of the countershaft (4) is greater than a predetermined torque limit, such that an acceleration of the vehicle would be detected upon engaging the starting gear without activation of an actuator, before activating at least one actuator in the drive train of the vehicle.

2. The method according to claim 1, further comprising the step of accomplishing relieving of the torque of the countershaft (4) through action of a braking-control device (40) operating brake actuators on drive wheels (52) of the motor vehicle such that the brake actuators are activated in an engagement direction, upon engaging the starting gear, and then activated, in a disengaging direction, when an actual torque of the countershaft (4) is reduced below a value of a torque limit.

3. The method according to claim 2, further comprising the step of controlling, via the brake-control device (40), at least one of brake actuator of a main brake (42) and parking brake of the motor vehicle.

4. The method according to claim 1, further comprising the step of applying a force for synchronization of the at least one coupling and synchronizing device when the starting gear is engaged, and selecting the force such that torque produced on at least drive wheel (52) of the vehicle, during the synchronization process, is insufficient to initiate motion of the motor vehicle.

5. The method according to claim 4, further comprising the step of selecting the force so as to be dependent upon at least one of a static friction of the drive wheels (52) of the motor vehicle, an inertial mass of the motor vehicle, and an inclination of the motor vehicle.

6. A method of operating an automatically synchronized transmission (1), of a countershaft design for a motor vehicle, comprising:
a countershaft (4) located parallel to an input shaft (2) and an output shaft (3), the input shaft (2) and the output shaft (3) are driving connectable with one another and with the countershaft (4) via mating gear wheel pairs, and
the transmission (1) including at least one coupling and synchronization device (30, 30', 30'', 30''') for at least one idler gear (10', 12', 14', 16', 18', 20') such that the at least one idler gear can be connected with the output shaft (3) in a rotationally fixed manner,
the method comprising the step of:
when the motor vehicle is at a standstill and a starting gear is engaged, reducing a torque of the countershaft (4) so as to prevent unwanted vehicle-acceleration by engaging a second synchronizing device of the automatically synchronized transmission.

7. The method according to claim 6, further comprising the step of effecting synchronization, via the second synchronizing device, by a gear having a smaller gear ratio than the starting gear.

8. The method according to claim 7, further comprising the step of providing the gear, having a smaller gear ratio than the starting gear, with an additional engageable gear section.

9. A device for operating an automatically synchronized transmission (1) for a motor vehicle, the device comprising:
a braking-control device (40) being connected, via sensor cables, to:
a torque sensor (50) located on a countershaft (4) of the synchronized transmission (1);
a motor vehicle sensor (44) for determining a speed of the vehicle;
and
for receiving an input indicating engagement of a starting gear;
the braking-control device (40) being connected with actuators (42), via control cables, for relieving of a torque on the countershaft (4) and configured in such a way that:
when the motor vehicle is at a standstill,
when a starting gear of the synchronized transmission (1) is engaged by the braking-control device (40), and
when an actual torque on the countershaft (4) of the synchronized transmission (1) is greater than a predetermined torque limit,
a signal is transmitted to the actuators (42).

10. The device according to claim 9, wherein the actuators are brake actuators for at least one of a main brake (42) and an emergency brake of the motor vehicle.

11. The device according to claim 10, wherein the actuators communicate with and activate a second synchronizing device.

12. The device according to claim 9, further comprising at least one of an inclination sensor (46) for sensing a current inclination of the motor vehicle and a static friction sensor (48) for determining the static friction of the vehicle wheels in relation to a road surface.

* * * * *